United States Patent [19]

Maybon

[11] Patent Number: 5,580,472
[45] Date of Patent: Dec. 3, 1996

[54] PAPER PULP DEFIBERING OR REFINING PLATE AND METHOD OF MANUFACTURING IT

[75] Inventor: Guy Maybon, Saint Jorioz, France

[73] Assignee: Technogenia S.A., Saint Jorioz, France

[21] Appl. No.: 266,716

[22] Filed: Jun. 28, 1994

[30] Foreign Application Priority Data

Jul. 13, 1993 [FR] France ................... 93 08791

[51] Int. Cl.$^6$ .................................. B23K 26/08
[52] U.S. Cl. ................. 219/121.66; 219/121.85; 427/597
[58] Field of Search ................ 219/121.63, 121.64, 219/121.65, 121.66, 121.73, 121.84, 121.85; 148/524, 525, 565; 427/555, 556, 597, 201, 203, 205; 51/295

[56] References Cited

U.S. PATENT DOCUMENTS

| | | |
|---|---|---|
| 3,117,603 | 1/1964 | Van Keuren et al. . |
| 4,218,494 | 8/1980 | Belmondo et al. ................ 219/121.64 |
| 4,423,845 | 1/1984 | Frazier et al. . |
| 4,951,888 | 8/1990 | Sharpe et al. ................... 51/309 |
| 4,981,716 | 1/1991 | Sundstrom ..................... 427/556 |
| 5,201,917 | 4/1993 | Brunet et al. . |
| 5,245,155 | 9/1993 | Pratt et al. ................... 219/121.63 |
| 5,314,709 | 5/1994 | Doany et al. ................... 427/555 |
| 5,372,861 | 12/1994 | Kerrand et al. ................ 427/597 |
| 5,418,350 | 5/1995 | Freneaux et al. ............... 219/121.84 |

FOREIGN PATENT DOCUMENTS

| | | |
|---|---|---|
| 480851 | 4/1992 | European Pat. Off. . |
| 1-73063 | 3/1989 | Japan . |
| 1-53790 | 3/1989 | Japan ....................... 219/121.85 |
| 2237656 | 5/1991 | United Kingdom ........... 219/121.85 |
| 91/02841 | 3/1991 | WIPO . |
| 92/11941 | 7/1992 | WIPO . |

OTHER PUBLICATIONS

Brazing Handbook, Fourth Edition, American Welding Society, Miami, Florida, p. 1, 1991.

*Primary Examiner*—Tu Hoang
*Assistant Examiner*—Gregory L. Mills
*Attorney, Agent, or Firm*—William H. Eilberg

[57] ABSTRACT

A paper pulp defibering or refining plate in accordance with the invention comprises a comminuting surface having a large number of ridges separated by grooves. The plate body is made from a first material such as stainless steel or cast iron providing the overall mechanical strength of the plate in use. The upper part of the ridges is a layer of an abrasion resistant material based on grains of tungsten carbide bound in a metal alloy whose melting and brazing characteristics are appropriate to laser resurfacing on the plate body. The ridges are resurfaced successively by scanning a laser beam and a powder spray nozzle in one or more passes.

4 Claims, 10 Drawing Sheets

PAPER PULP DEFIBERING OR REFINING PLATE AND METHOD OF MANUFACTURING IT

BACKGROUND OF THE INVENTION

1. Field of the Invention

The present invention concerns plates for defibering or refining paper pulp, having an abrasion resistant comminuting surface for breaking up clumps of fibers.

2. Description of the Prior Art

In paper pulp defibering or refining machines such as those described in U.S. Pat. Nos. 3,117,603 and 4,423,845, for example, two plates rotating relative to each other each carry an assembly of circular sector shaped plates disposed in a circular ring, the operative surfaces of the plates having generally radial grooves and being made from an abrasive material such as alumina, zirconium oxide or silicon carbide, for example. The comminuting surface thus has a large number of ridges separated by grooves, the shape of the ridges and grooves being carefully chosen to defiber the paper pulp. The material inserted between the plates flows in the radial grooves and the shape, spacing and direction of the grooves determine the size of the paper pulp fibers obtained. The dimensions and the position of the plate must therefore be highly accurate.

The refining and defibering plates usually employed at present are made either from cast iron alloys known as NIHARD cast irons or from stainless steel.

The ridges on the plates tend to wear down with use, due to the abrasive effect of the paper pulp fibers or abrasive materials that the paper pulp contains. The resulting progressive deformation of the ridges renders the plate unusable after a period which is usually not very long.

Cast iron alloy plates are manufactured by casting. When worn down they have to be discarded.

Stainless steel plates wear more quickly, but they can be recut when worn to restore the initial profile of the grooves. This can be done once or twice. However, recutting tends to weaken the plate and is a costly operation.

One proposal for extending the life of paper pulp refining or defibering plates is to exploit the advantageous properties of harder materials such as grains of tungsten carbide.

For example, document EP-A-0 480 851 proposes to produce an abrasion resistant surface comminuting or refining plate by infiltration of a molten brazing alloy into a heap of grains of tungsten carbide in a mold. This technique requires a mold and therefore cannot be used for resurfacing an existing comminuting or refining plate.

Document WO-A-91 02841 proposes the application of an abrasive surface layer to a refining plate by using a laser beam to melt the surface layer of the steel substrate and spraying onto the molten surface layer an abrasive material such as tungsten carbide in the form of powder with a particle size between 120 microns and 2.5 millimeters. The resulting layer is abrasive and necessarily thin because only one melting and spraying pass is possible. This treatment tends to weaken the substrate, by reducing the thickness of its homogeneous metal part. Also, the surface layer does not have good abrasion resistant properties.

Document WO-A-92 11941 proposes the manufacture of a refining plate with an abrasion resistant layer by cold isostatic pressing of a mixture of tungsten carbide powder and a powdered alloy of iron, nickel, chromium, carbon and molybdenum. The tungsten carbide content is low, being between 10% and 50% by weight of the mixture of powders. This technique requires a mold and a costly high-pressure press and is thus not applicable to resurfacing an existing defibering or refining plate.

The problem to which the present invention is addressed is that of designing a new paper pulp defibering or refining plate structure and a method of manufacturing it, the plate having improved abrasion resistance, without reducing the mechanical strength of the body of the plate, and a greater efficiency in use.

In particular, the invention is directed to increasing the abrasion resistance of the tops of the ridges, which constitute the most heavily loaded areas of the plate, whilst favoring flow of paper pulp in the grooves.

To this end, the basic idea of the invention is to resurface the top of the ridges selectively using an appropriate abrasion resistant material, retaining for the base of the ridges and the bottom of the grooves a material which favors flow of paper pulp. Flow is improved by the polishing effect of the flow of paper pulp.

The problem is then how to carry out this resurfacing at reasonable cost, with good homogeneity and good adherence to the body of the plate, using a resurfacing material containing a high proportion of hard abrasion resistant material, with a sufficient resurfacing thickness, and without distorting the body of the plate, in order to preserve the accuracy of the geometrical shape of the plate.

The solution of the invention is to resurface only the tops of the ridges of the plates by means of a laser beam in association with a powder injector.

SUMMARY OF THE INVENTION

Accordingly, a paper pulp defibering or refining plate in accordance with the invention comprises a comminuting surface having a large number of ridges separated by grooves and such that:

the plate body is made of a first material adapted to provide the overall mechanical strength of the plate in use, the upper part of the ridges is made from a layer of a composite material based on a powdered hard abrasion resistant material bound in a brazing metal alloy whose melting and brazing characteristics are appropriate for laser resurfacing of the first material.

This constitution of the upper part of the ridges exploits the abrasion resistant properties of the hard abrasion resistant material and the brazing metal alloy, which are harder than the first material forming the body of the plate. In service, this leads to the appearance of relative roughness consequent upon progressive emergence of the hard grains from the alloy matrix binding them together.

The effect of this relative roughness can enhance the mechanical properties of the paper made from paper pulp refined by this means.

This constitution of the upper part of the ridges also exploits the good melting properties of the brazing alloy which binds the grains of hard abrasion resistant material into a homogeneous and mechanically strong matrix in which the grains are strongly bound even when present in proportions by weight exceeding 50%, its relatively low melting point protecting the hard abrasion resistant material grains from excessive heating which could damage them.

The body of the plate, the lower part of the ridges and the bottom of the grooves can be made from cast iron or stainless steel. This retains the good surface properties of stainless steel or cast iron in the groove bottoms to facilitate flow of paper pulp in said grooves.

The composite material forming the upper part of the ridges can advantageously be formed of grains of tungsten carbide bound in a metal alloy based on nickel, chromium, silicon, iron and boron.

The method in accordance with the invention of manufacturing a paper pulp defibering or refining plate comprises a stage of laser resurfacing of the upper surfaces of the ridges of a plate body in a first material using a laser directing a laser beam onto an impact area scanned along the upper surfaces of the ridges to be resurfaced and associated with a powder spray nozzle directing onto the impact area of the laser beam a powder based on a hard abrasion resistant material and a brazing metal alloy adapted to be melted by the laser beam and to be brazed to said first material, adhering to the grains forming the hard abrasion resistant material powder, the laser beam having an intensity sufficient to melt the surface of the first material and to melt the brazing metal alloy powder in the area of impact.

Each ridge can advantageously be resurfaced in a number of successive passes during which the area of impact of the laser beam and of the powder is scanned along the entire length of the ridge in alternate directions, the laser beam being focused on each pass in an impact area slightly larger than the width of the ridge, the movement of the laser beam being reversed beyond the ends of the ridge. In this way the resurfacing thickness can be further increased.

The advantage of the method is that resurfacing can be carried out to produce a surplus thickness which is then reduced by machining to produce sharp lateral edges of the ridges again.

Other objects, features and advantages of the present invention emerge from the following description of specific embodiments of the invention given with reference to the appended drawings.

DETAILED DESCRIPTION OF THE PREFERRED EMBODIMENTS

Figure 1:
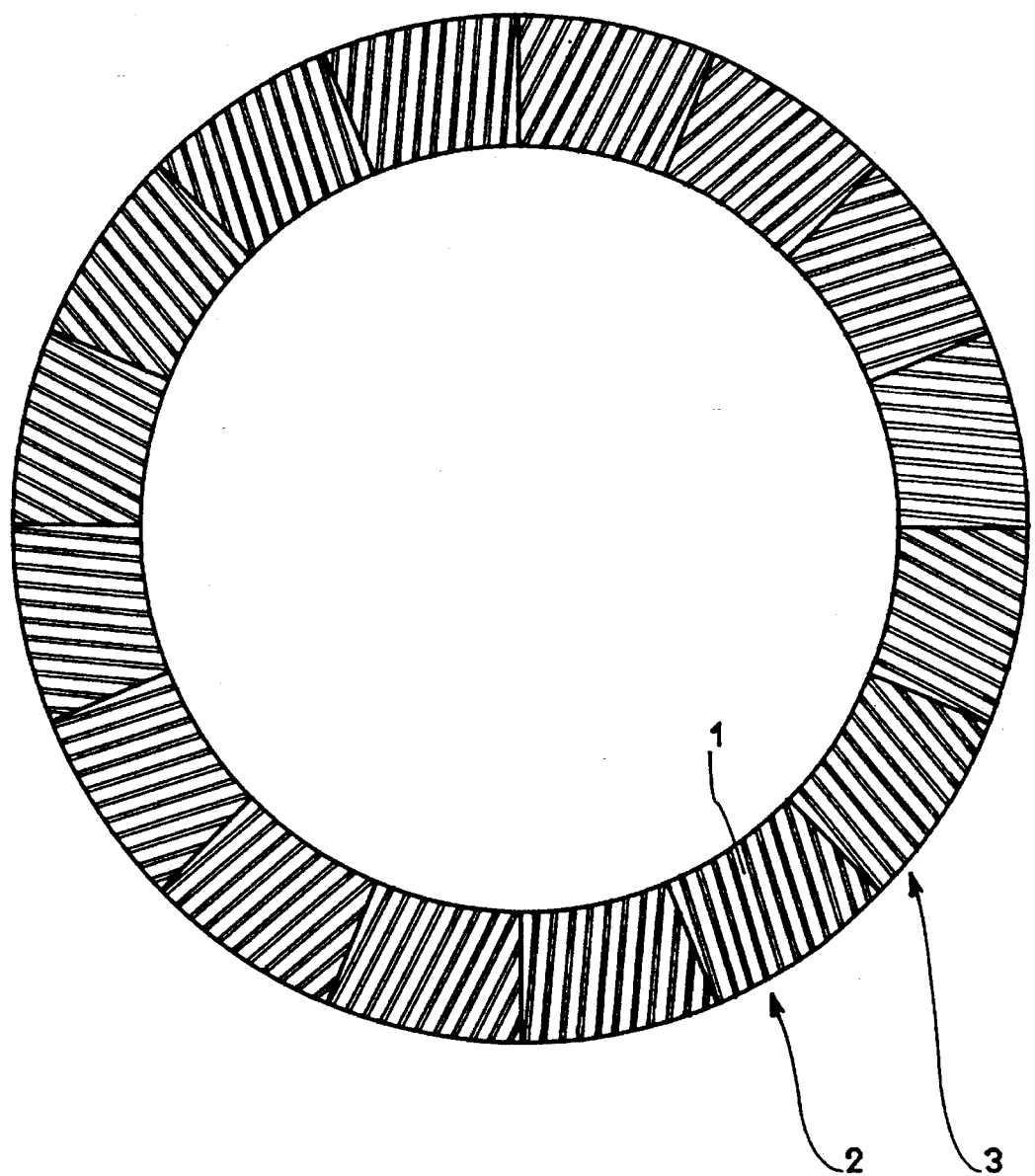
FIG. 1 is a plan view of one particular form of paper pulp refining or defibering disk that can be produced in accordance with the invention.
Figure 2:
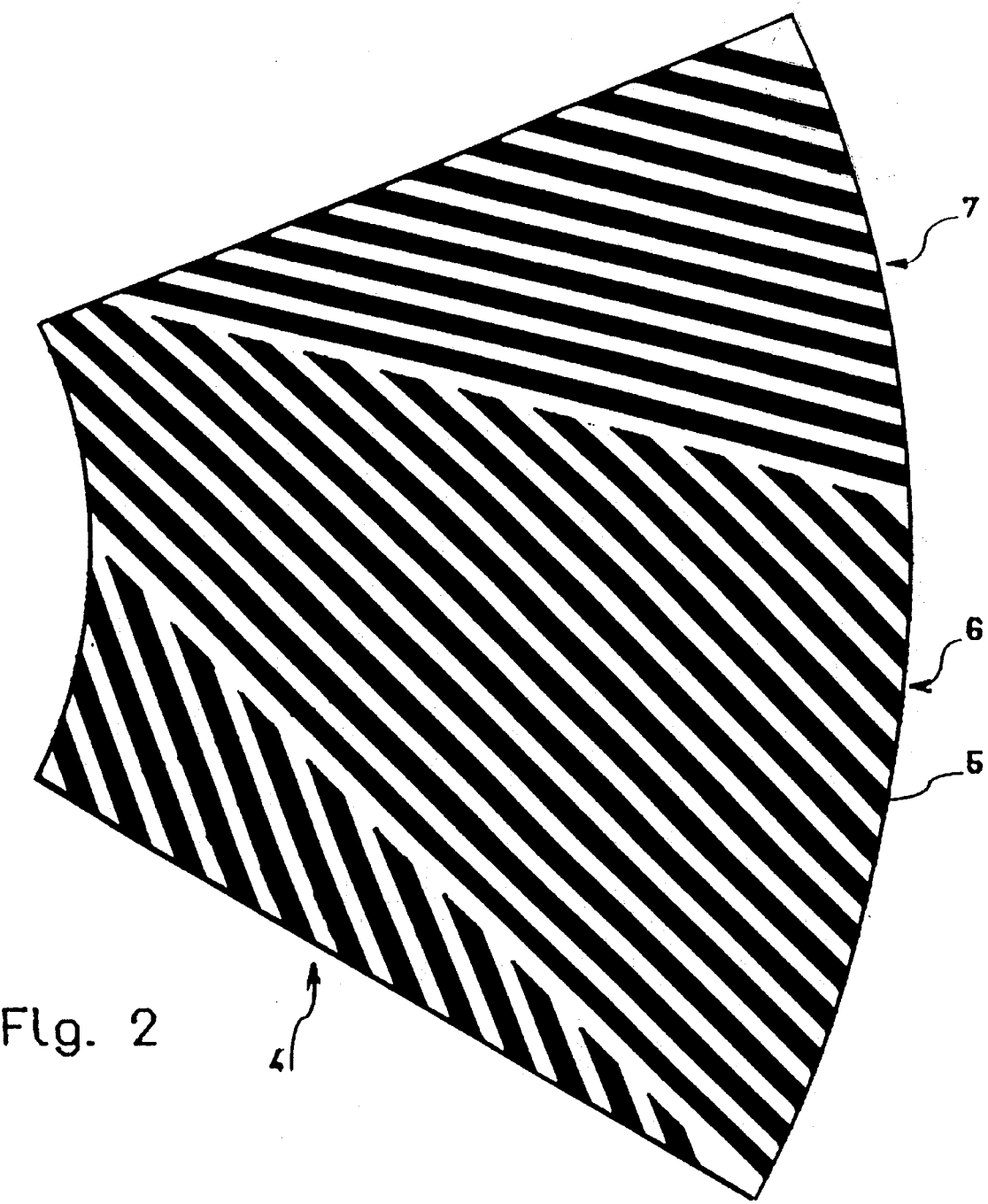
FIG. 2 is a plan view of a circular sector shaped paper pulp defibering or refining plate which can be produced in accordance with the invention.

As shown in plan view in FIGS. 1 and 2, the paper pulp defibering or refining plates comprise a comminuting surface having a large number of ridges separated by grooves.

In FIG. 1, the plate is in the form of a continuous ring and the upper comminuting surface comprises ridges such as the ridge 1 distributed in groups of parallel ridges, each group forming one sector such as the sector 2 or the sector 3, the ridges of two adjacent sectors 2 and 3 having different orientations. A plate of this kind can be made in one piece, with a plate body made of a first material such as stainless steel adapted to provide the overall mechanical strength of the plate in use. The upper part of the ridges is a layer of a composite material based on a hard abrasion resistant material powder bound in a metal brazing alloy whose melting and brazing characteristics are suitable for laser resurfacing of the first material.

In the FIG. 2 embodiment the paper pulp defibering or refining plate is an annular sector, a plurality of identical sectors being fastened together on an annular base to form a member similar to that of FIG. 1. The sector 4 of FIG. 2 is also formed of series of parallel ridges such as the ridge 5, the parallel ridges being divided into a plurality of groups, for example a first group 6 and a second group 7. The ridges in each group are parallel, the ridges of two adjacent groups 6 and 7 having different orientations. In this second embodiment, shown in FIG. 2, the plate body can be made from cast iron, the upper part of the ridges being constituted by a layer of abrasion resistant material similar to that of the FIG. 1 embodiment.

Figure 16:
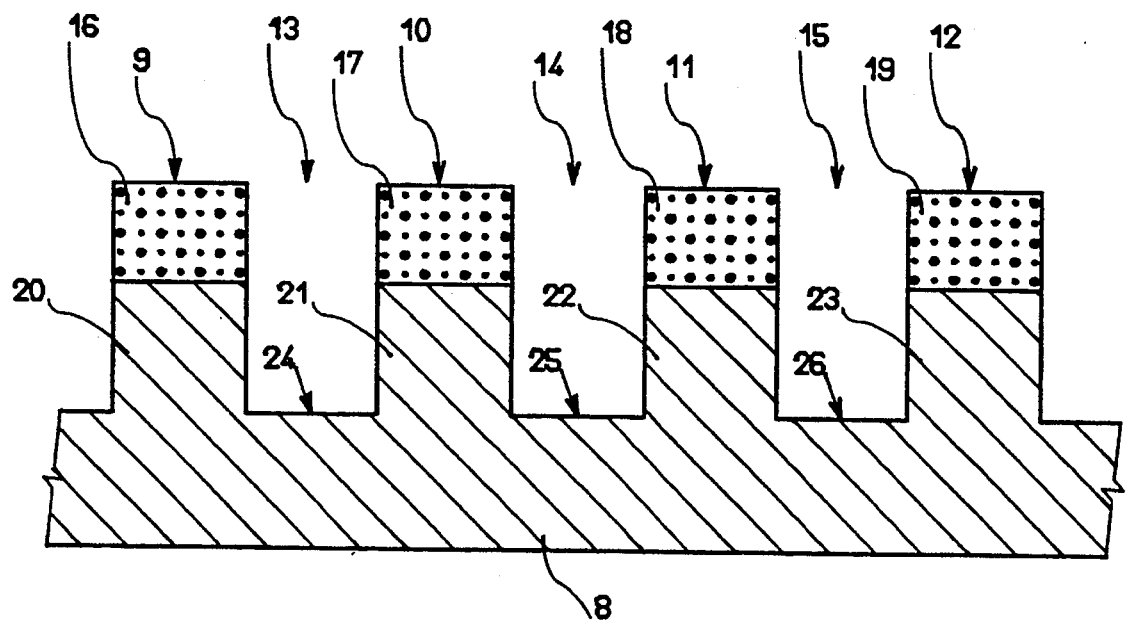
FIG. 16 shows in transverse section the succession of ridges on a plate resurfaced in accordance with the present invention.

Accordingly, as shown in transverse section in FIG. 16, the plate body 8 of a paper pulp defibering or refining plate in accordance with the invention is made from a first material such as stainless steel or cast iron providing the overall mechanical strength of the plate in use. The figure shows four ridges 9, 10, 11 and 12 separated by respective grooves 13, 14 and 15. The respective upper parts 16, 17, 18 and 19 of the ridges 9 through 12 are formed by a layer of a composite material based on a hard abrasion resistant material powder bound in a metal alloy. The composite material forming the upper part of the ridges 9 to 12 can advantageously be in the form of grains of tungsten carbide bound in a brazing metal alloy based on nickel, chromium, silicon, iron and boron.

The percentage by weight of tungsten carbide in the composite material can advantageously be between 50% and 70%. This high concentration of tungsten carbide, in excess of 50% by weight, is made possible by the resurfacing method in accordance with the present invention.

The tungsten carbide can advantageously be in the form of substantially spherical grains of tungsten carbide.

The stainless steel or cast iron plate body 8 forms the lower part 20 to 23 of the respective ridges 9 to 12 and the bottom 24 to 26 of the respective grooves 13 to 15.

The abrasion resistant material upper part of the ridges usually has a height of around 1 millimeter, whereas the stainless steel or cast iron lower part of the ridges is usually about 6 to 8 millimeters high, depending on the type of plate.

A paper pulp defibering or refining plate of this kind is manufactured starting with a plate body 8, either a brand new plate body or a plate previously used and the ridges of which have been partly worn down by the abrasive paper pulp. The upper surfaces of the ridges on this plate body are resurfaced using a laser to scan the upper edges to be resurfaced associated with a powder spray nozzle directing onto the impact area of the laser beam a powder based on hard abrasion resistant material and a metal alloy adapted to be melted by the laser beam and to be brazed to the material forming the plate body 8.

Figure 3:
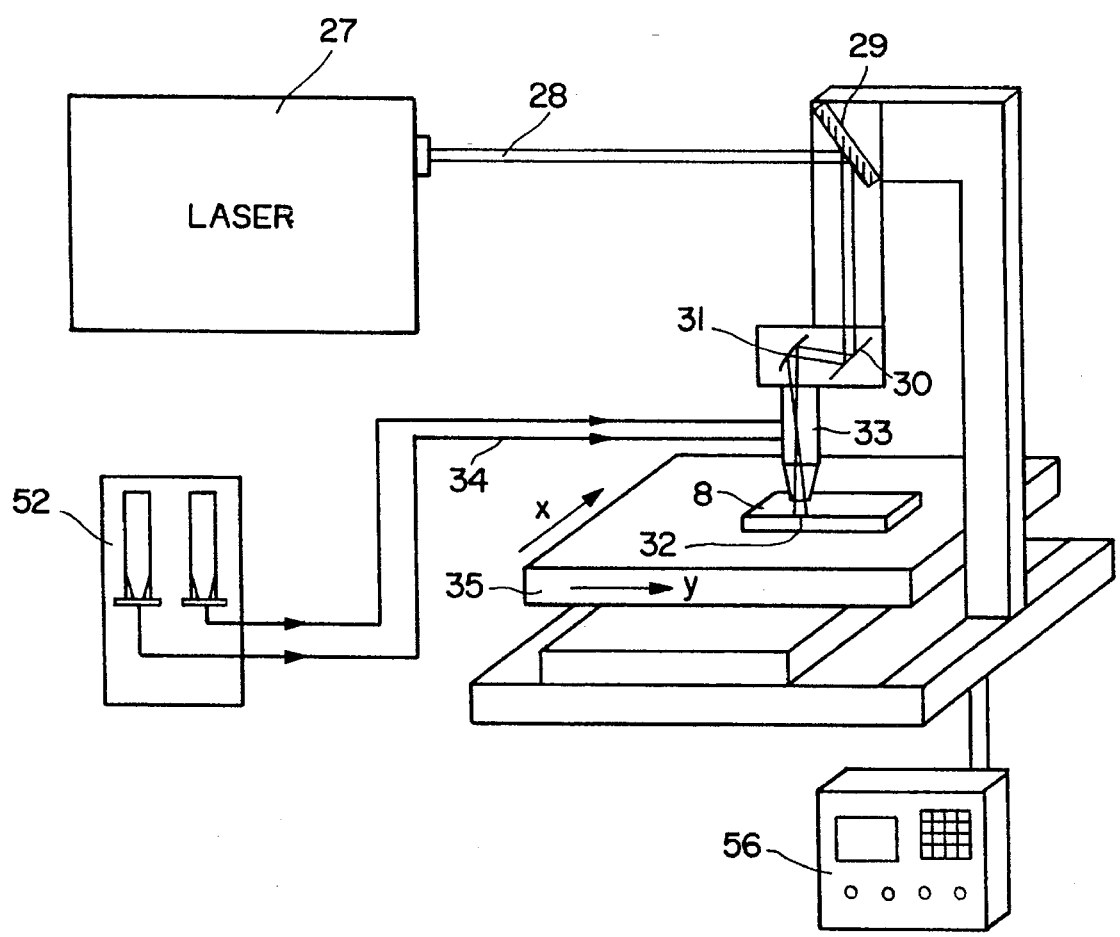
FIG. 3 shows a laser resurfacing device for implementing the present invention.

FIG. 3 is a diagrammatic representation of a laser resurfacing installation which can be used in implementing the invention. This installation comprises a power laser 27 producing a beam 28 of coherent and monochromatic light. The beam 28 propagates in one direction only, homogeneously, and has only one wavelength. There is very little divergence of the beam.

A set of mirrors 29 and 30 directs the beam onto a focusing head 31. The focusing head 31 directs the laser beam onto the surface to be resurfaced of the plate body 8. The focusing head 31 is adapted to focus the laser beam so that the latter impinges on the plate body 8 in a small impact area 32. For example an area with a diameter between about 0.5 and 5 millimeters.

A powder dispenser 52 constitutes a reservoir holding a powdered material for resurfacing the plate body. This powder contains grains of hard abrasion resistant material which remain solid when exposed to the laser beam and grains of brazing alloy which melt when exposed to the laser beam. The powder dispenser 52 is adapted to fluidize the powder by means of a neutral gas such as argon or helium and to convey it pneumatically to a spray nozzle 33 via powder feed lines 34. The spray nozzle 33 is adapted to shape the fluidized powder leaving the nozzle into a convergent jet impinging on the same impact area 32 on the plate body 8. The fluidized powder jet leaving the nozzle must be as closely as possible coincident with the shape of the laser beam 28 in this area.

The powder dispenser 52 is of a type in which the mass flowrate of powder can be precisely controlled, in order to achieve excellent reproducibility and perfect regularity of the flowrate, which parameters have a direct influence on the regularity and the quality of the resulting resurfacing.

The laser beam impinges on the surface of the plate body 8 to be resurfaced close to the vertical. The outlet orifice of the nozzle 33 is maintained at a constant distance of approximately 10 millimeters from the surface to be resurfaced.

The plate body 8 is placed on a table 35 which is moved horizontally in two directions X and Y by drive means controlled by a numerical controller 56. This causes the area of impact 32 of the laser beam and of the powder leaving the spray nozzle 33 to be scanned over the surface of the plate body 8 to be resurfaced.

Figure 4:
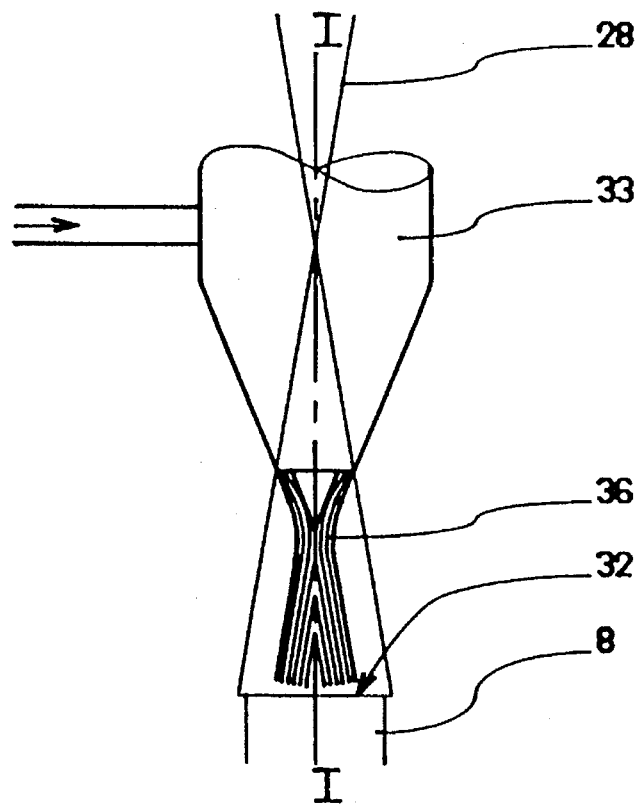
FIG. 4 is a diagrammatic view showing a nozzle for injecting powder coaxial with the laser beam.

In the embodiment shown in FIG. 4 the spray nozzle 33 is of a first type which sprays coaxially with the axis I—I of the laser beam 28. The fluidized powder moves in a helix coaxial with the laser beam 28 and the powder jet 36 is concentrated in order to concentrate the area of impact of the powder onto the area of impact 32 of the laser beam 28 on the plate body 8 to be resurfaced. This impact area 32 is at the top of a ridge.

Figure 5:
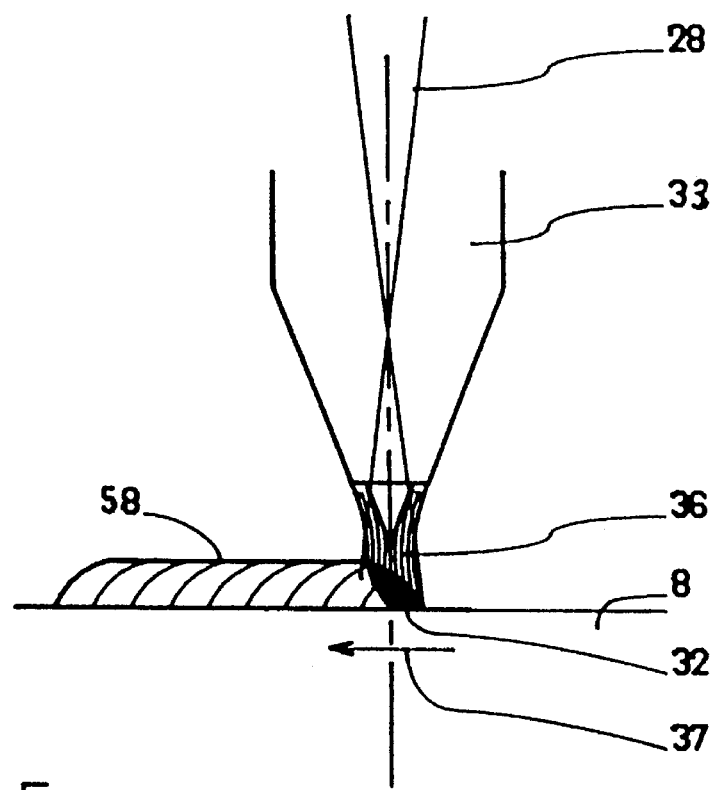
FIG. 5 shows the displacement of the coaxial nozzle and the laser beam for resurfacing a ridge of a plate in accordance with the invention.

FIG. 5 shows progressive resurfacing by displacement of the plate body 8 in the direction 37. In the area of impact 32 the laser beam 28 melts the brazing alloy powder, which is brazed to the plate body 8, binding the grains of abrasion resistant material and, upon cooling, progressively forming a deposit 58 on the top of the ridge being resurfaced.

Figure 6:
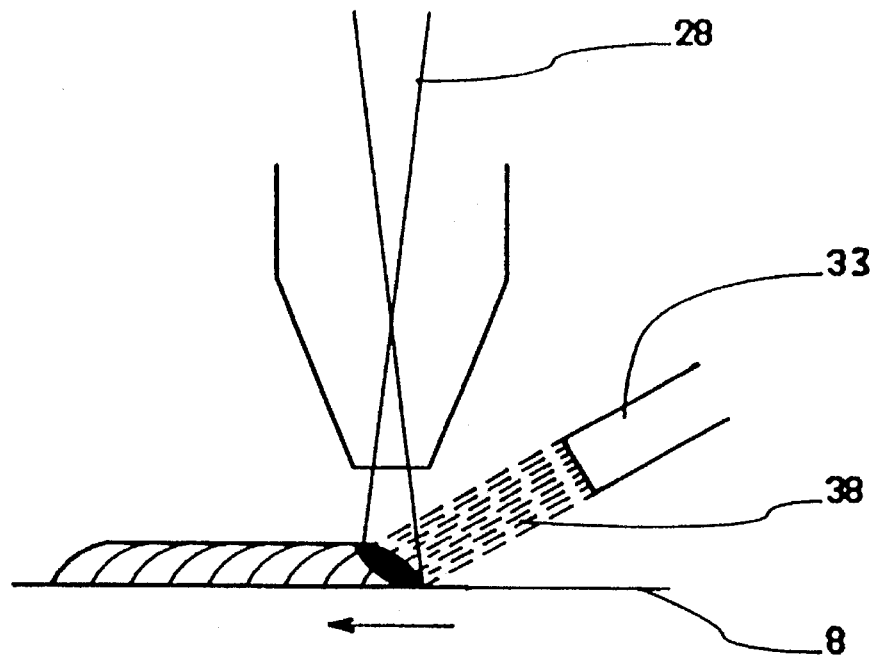
FIG. 6 and FIG. 7 show the displacement of a lateral nozzle and the associated laser beam in a different embodiment of the invention.
Figure 7:
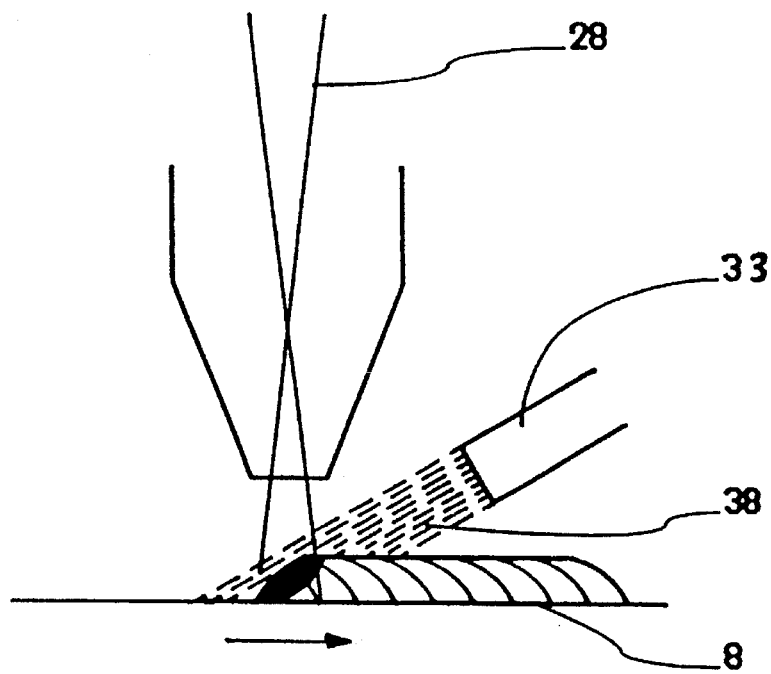

In the embodiment shown in FIGS. 6 and 7 the spray nozzle 33 is a lateral spray nozzle which sprays the powder at a given angle to the laser beam 28. The powder jet 38 is preferably in the vertical plane through the ridge to be resurfaced. The plate body 8 is scanned longitudinally of the ridge, in alternate directions, as shown in the figures.

The energy of the laser beam 28 melts the surface of the plate body 8 in the area of impact 32 and melts the brazing alloy powder. The powder therefore impinges partly melted on the surface of the plate body 8. The alloy powder is trapped on the surface and melts further during interaction of the laser beam 28 with the plate body 8, so forming a deposit.

To match the resurfacing exactly to the upper surface of the ridges the laser beam has to be controlled so that the area of impact 32 has a diameter substantially equal to the width of the ridge to be resurfaced.

The thickness of the deposit is between 0.3 millimeter and 1.5 millimeters for a first pass. The processing speed can be from a few centimeters per minute to a few meters per minute, depending on the power of the laser 27. A ridge can be resurfaced in a single pass if the thickness of the deposit is sufficient.

Figure 8:
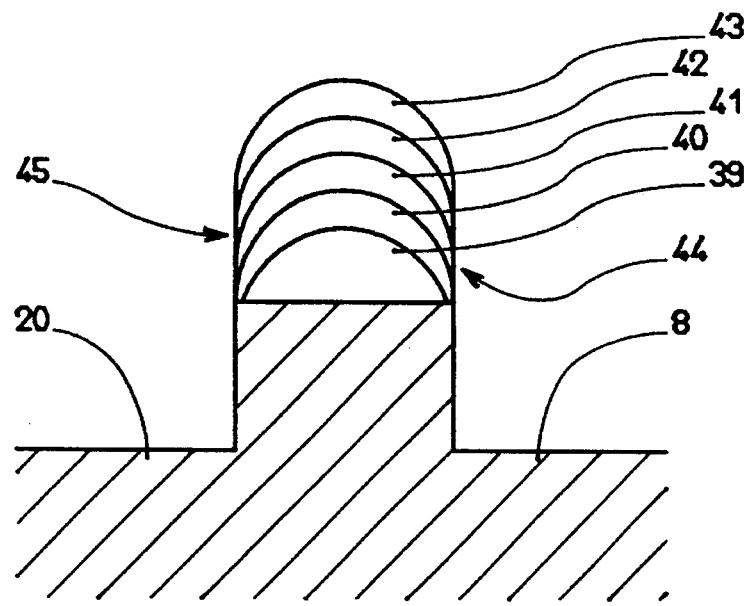
FIG. 8 shows the successive stages of resurfacing a ridge of a plate in accordance with the invention in transverse cross-section.

For resurfacing to a greater thickness a ridge is resurfaced in a number of successive passes during which the area of impact 32 of the laser beam and the powder is scanned along the entire length of the ridge, in alternate directions. The laser beam 28 is focused on each pass in an impact area 32 slightly larger than the width of the ridge. These successive passes are effected by moving the ridge longitudinally, with the laser beam impacting the top of the ridge perpendicularly, and with a coaxial spray nozzle or a spray nozzle on the axis of the ridge a multilayer thick deposit is formed without changing the original width of the ridge. FIG. 8 shows the multilayer deposit, for example, with the plate body 8, the base 20 of the ridge and a succession of resurfacing layers, for example five layers 39 through 43. The flanks 44 and 45 are aligned with the sides of the ridge base 20, as shown in the figures, with virtually no projection or recession.

Figure 9:
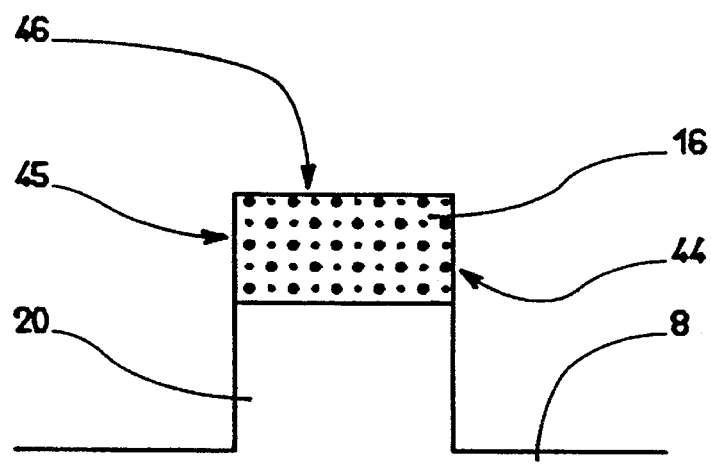
FIG. 9 shows the internal structure of a ridge resurfaced in accordance with the invention, after machining and in transverse cross-section.

All that is required thereafter is to machine the upper surface of the resurfacing to obtain a rectangular ridge cross-section as shown in FIG. 9 with a base 20 in the first material constituting the plate body 8, for example stainless steel or cast iron, and a top layer 16 of abrasion resistant resurfacing material whose flanks 44 and 45 are aligned with the flanks of the base 20 and whose upper surface 46 is machined to the height of the other ridges. Within the resurfacing layer 16 there are no defects in homogeneity caused by formation of the multilayer deposit. The distribution of the hard abrasion resistant material, such as tungsten carbide, grains is uniform within the metal matrix, regardless of the number of layers deposited.

Figure 10A:
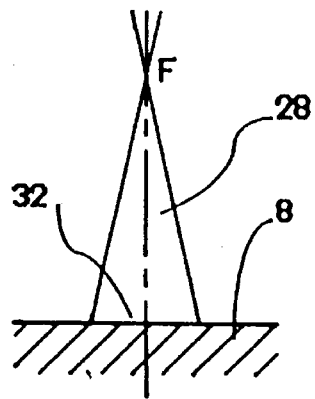
FIGS. 10a, 10b and 10c show the movement of the focus of the laser beam in a first embodiment of the invention.
Figure 10B:
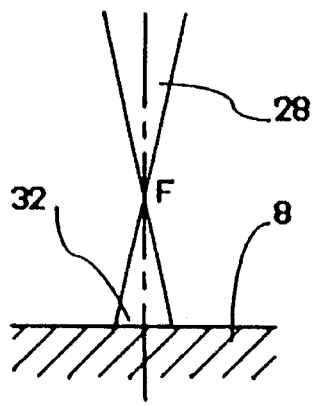
Figure 10C:
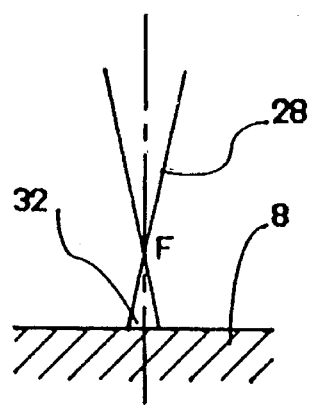

FIGS. 10a, 10b, and 10c show a first method of adjusting the laser beam 28, with a focus F above the plate body 8 to be resurfaced. By varying the distance between the focus F and the surface of the plate body 8 to be resurfaced the diameter of the area of impact 32 of the layer beam 28 can be varied, as shown in FIGS. 10a, 10b, and 10c.

Figure 11A:
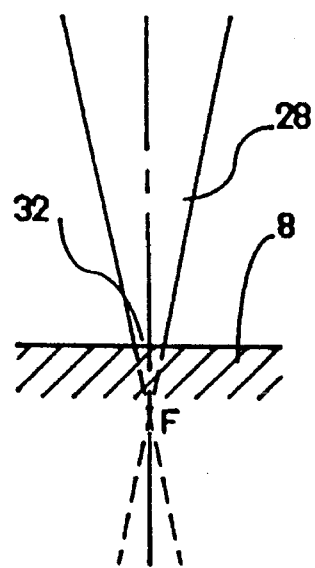
FIGS. 11a, 11b, and 11c show the movement of the focus of the laser beam in a second embodiment of the invention.
Figure 11B:
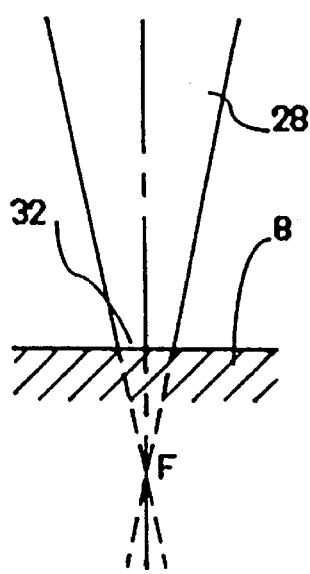
Figure 11C:
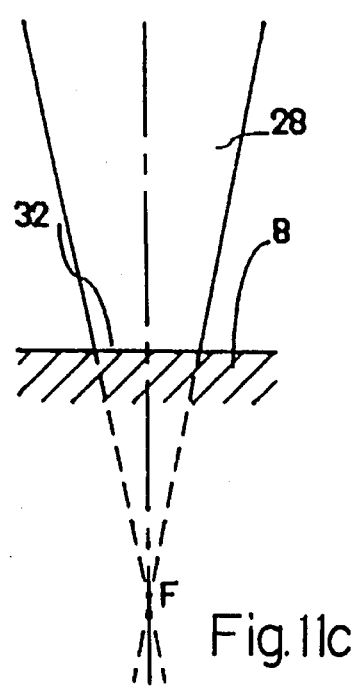

FIGS. 11a, 11b, and 10c shows a second method of adjusting the laser beam 28. In this second method the focus F is below the surface of the plate body 8 to be resurfaced and varying the distance of the focus F from the surface of the plate body 8 also varies the size of the impact area 32 of the laser beam 28.

In all cases the adjustment is such that the impact area 32 has a diameter substantially equal to or slightly greater than the width of the ridge to be resurfaced.

Figure 13:
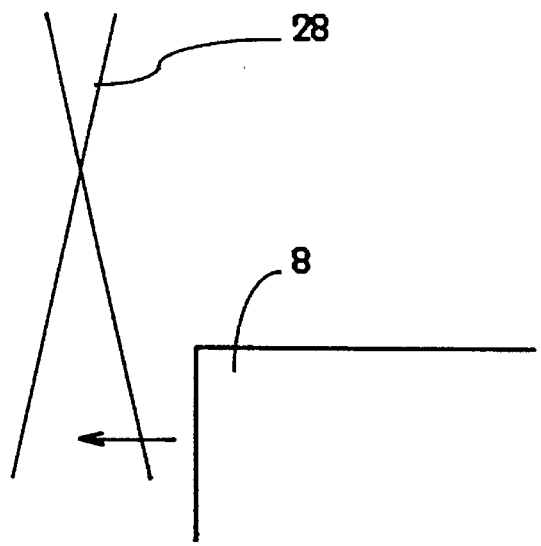
FIGS. 13 to 15 show the relative movements of the workpiece to be resurfaced and the laser beam on a ridge to be resurfaced.
Figure 14:
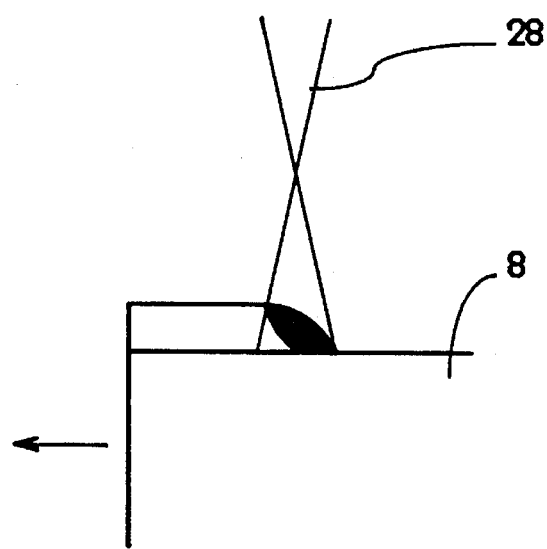
Figure 15:
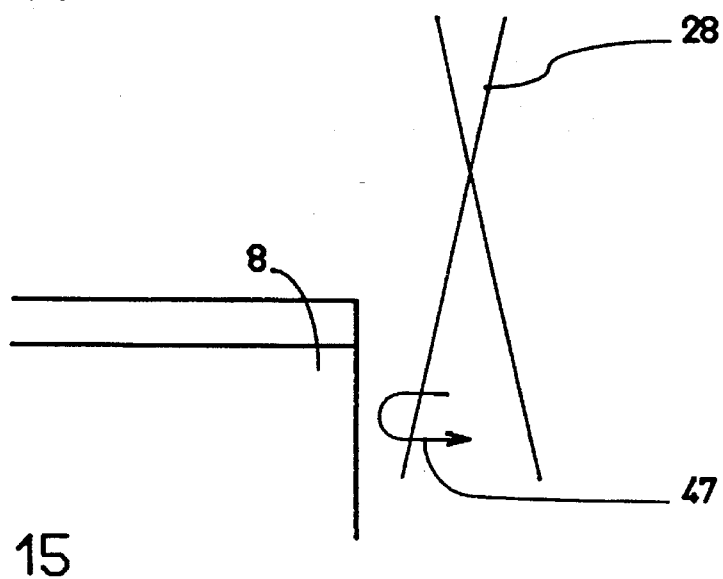

As shown in FIGS. 13 to 15 the movement of the laser beam 28 relative to the plate body 8 to be resurfaced is reversed beyond the ends of the ridge being resurfaced. Likewise, the laser beam 28 is turned on beyond the ridge. Thus in FIG. 13 the laser beam 28 is turned on before the plate body 8 reaches the beam as it moves in the direction of the arrow shown in the figure. Referring to FIG. 14, this movement causes the top of a ridge on the plate body 8 to be resurfaced. Referring to FIG. 15, reversing the movement of the plate body 8 as shown by the arrow 47 is carried out when the laser beam 28 is no longer impinging on the plate body 8. This avoids edge effects at the start of processing and at each 180° turn at the end of a ridge.

At each 180° turn the position of the focus F is modified to compensate for the height of the deposit previously formed, and thus to maintain a constant diameter of the impact area 32.

Figure 17:
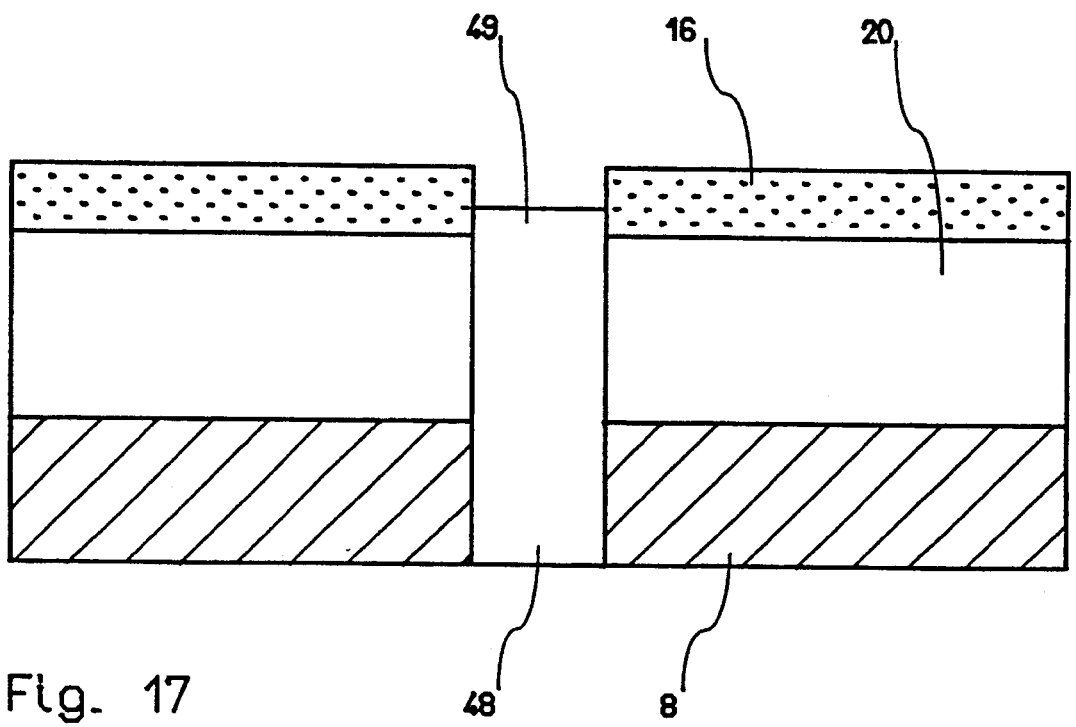
FIG. 17 is a side view showing a ridge resurfaced in accordance with the invention with an intermediate area in which the resurfacing is interrupted by means of a mask.

In some parts of the plate body 8 the resurfacing must be interrupted. For example, FIG. 17 shows a plate structure with a hole 48, for a fixing bolt, for example. When a hole 48 like this passes through a ridge, as shown in the figure, the resurfaced upper layer 16 of the ridge must be interrupted. To achieve this, a mask 49 is inserted in the hole 48 during resurfacing, the mask 49 being made either from a material which reflects the laser beam or from a material which absorbs the laser beam and is adapted to break down when heated. The mask 49 can be made from copper, for example, to reflect the laser beam.

The method in accordance with the invention has the advantage of accurate reproduction of the geometrical shape of the resurfaced ridges. The plate body 8 is relatively little affected by the heating effect of the laser beam during resurfacing and its distortion due to thermal expansion is thus extremely small or even negligible.

Figure 12:
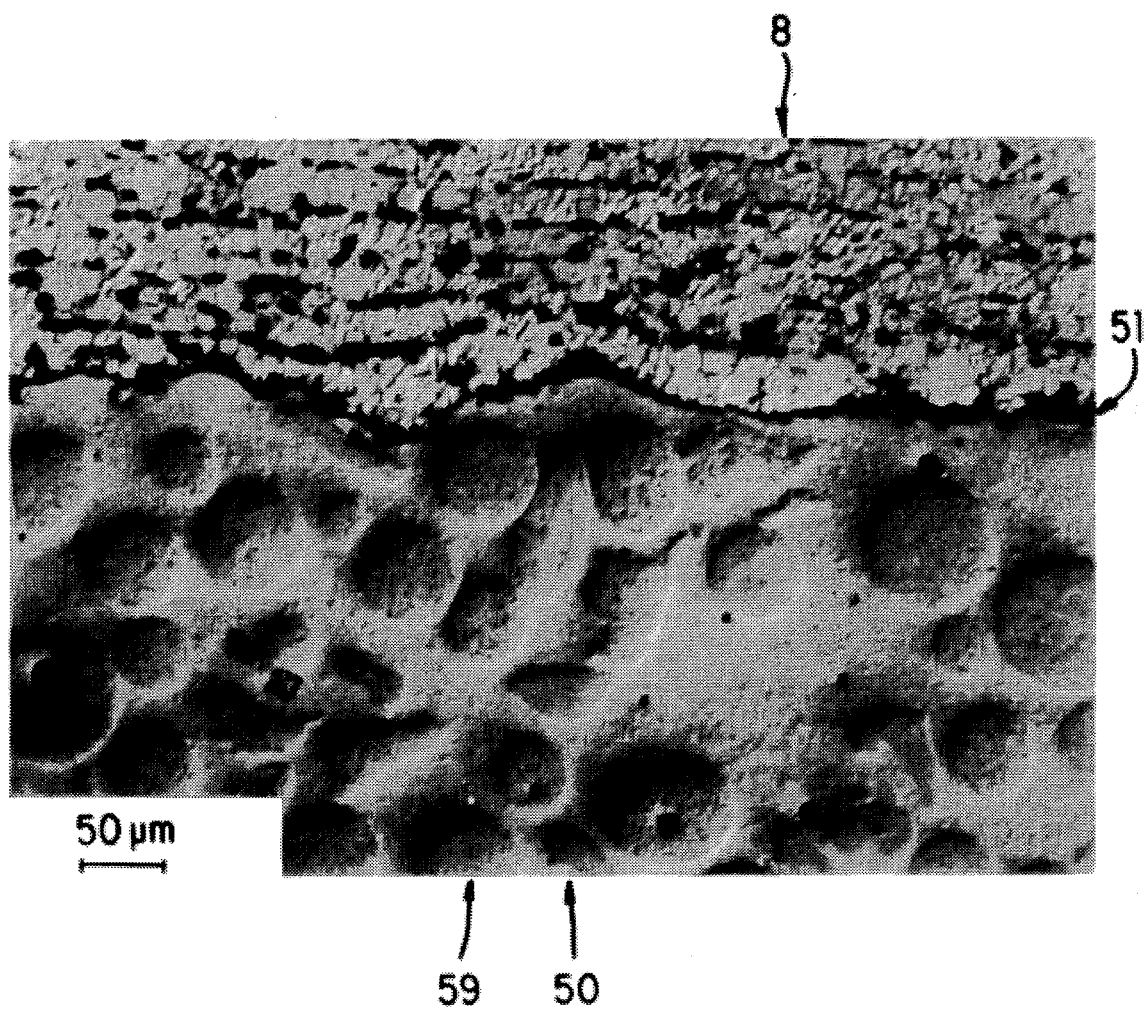
FIG. 12 is a view in transverse section to a smaller scale of the interface area of a laser deposit in accordance with the invention.

The bond between the resurfacing and the plate body 8 is excellent, as it is achieved by surface melting of the substrate. This is a metallurgical bond which makes the resurfacing very strongly adherent. The resurfacing obtained is homogeneous, non-porous and produces only a small dilution of the substrate. These features are shown in FIG. 12, which shows a regular distribution of the grains 59 of tungsten carbide in the metal matrix 50 and a thin layer 51 bonding the metal matrix to the substrate 8.

The grains of tungsten carbide 59 are not affected by the laser beam, the present method differing in this respect from plasma sputtering. The grains therefore retain all their mechanical properties, and in particular their hardness is not reduced. This has the advantage that an abrasion resistant material based on generally spherical tungsten carbide grains can be used.

The very high rates of solidification obtained by virtue of the highly localized heat treatment produce a very fine microstructure within the resurfacing matrix, and consequently excellent mechanical properties. In particular, the metal matrix based on nickel and chromium has a high hardness, not less than 600 HV.

The present invention is not limited to the embodiments specifically described but encompasses various variants and generalizations thereof within the scope of the following claims.

There is claimed:

1. A method of manufacturing a paper pulp defibering or refining plate, the plate comprising a comminuting surface having a plurality of ridges, each of the ridges having an upper surface, the ridges being separated by grooves, the method comprising the steps of:

a) directing a laser beam onto an impact area on the upper surface of one of the ridges, b) spraying onto said impact area a powder made of grains of an abrasion-resistant material and a brazing alloy, and c) moving the plate so that the laser beam and powder are scanned over a region to be coated with said abrasion-resistant material, wherein the laser beam has an intensity sufficient to melt said upper surface and to melt the brazing alloy powder in the impact area, but not sufficient to melt the grains of the abrasion-resistant material, wherein the brazing alloy becomes brazed to the upper surface of said one of the ridges, wherein the brazing alloy also becomes brazed to the abrasion-resistant material.

2. The method of claim 1, wherein each ridge has a width, a length, and two ends, and wherein each ridge is coated with the abrasion-resistant material in a plurality of successive passes during which the impact area is moved along the entire length of the ridge, according to a motion in alternate directions, wherein on each pass the impact area is slightly greater than the width of the ridge, wherein the laser beam has a direction of movement relative to the plate, wherein the direction of movement of the laser beam is reversed beyond the ends of the ridge.

3. The method of claim 1, wherein a powder spray nozzle, coaxial with the laser beam, is used to impart to the powder a motion coaxial with the laser beam and to concentrate the powder onto said impact area of the laser beam.

4. The method of claim 1, further comprising the step of varying a size of the impact area by varying a focal length of the laser beam.

* * * * *